US012752759B2

(12) United States Patent
Denti et al.

(10) Patent No.: US 12,752,759 B2
(45) Date of Patent: Oct. 6, 2026

(54) BRAKE-BY-WIRE TYPE BRAKING SYSTEM FOR MOTORCYCLES

(71) Applicant: BREMBO S.p.A., Curno (IT)

(72) Inventors: Francantonio Denti, Curno (IT); Matteo Folatti, Curno (IT); Samuele Mazzoleni, Curno (IT); Mauro Brembilla, Curno (IT); Alessandro Bertagna, Curno (IT)

(73) Assignee: Brembo S.P.A., Bergamo (IT)

( * ) Notice: Subject to any disclaimer, the term of this patent is extended or adjusted under 35 U.S.C. 154(b) by 381 days.

(21) Appl. No.: 18/558,553

(22) PCT Filed: May 4, 2022

(86) PCT No.: PCT/IB2022/054121

§ 371 (c)(1),
(2) Date: Nov. 2, 2023

(87) PCT Pub. No.: WO2022/234480

PCT Pub. Date: Nov. 10, 2022

(65) Prior Publication Data

US 2024/0239321 A1 Jul. 18, 2024

(30) Foreign Application Priority Data

May 6, 2021 (IT) ........................ 102021000011621

(51) Int. Cl.
*B60T 13/74* (2006.01)
*B60T 8/17* (2006.01)
(Continued)

(52) U.S. Cl.
CPC .......... *B60T 13/686* (2013.01); *B60T 8/1706* (2013.01); *B60T 13/148* (2013.01); *B60T 13/62* (2013.01);
(Continued)

(58) Field of Classification Search
CPC ...... B60T 13/745; B60T 8/1706; B60T 8/261; B60T 8/3225; B60T 7/085
See application file for complete search history.

(56) References Cited

U.S. PATENT DOCUMENTS 4,598,954 A * 7/1986 Hayashi .................. B60T 8/261 188/106 P
4,626,038 A * 12/1986 Hayashi .................. B60T 8/265 303/113.5

(Continued)

FOREIGN PATENT DOCUMENTS

CN 105691372 A 6/2016
CN 108263366 A 7/2018

(Continued)

OTHER PUBLICATIONS

European Patent Office, International Search Report, issued in PCT/IB2022/054121, Jul. 22, 2022, Rijswijk, NL.

(Continued)

*Primary Examiner* — Bradley T King
(74) *Attorney, Agent, or Firm* — Marshall & Melhorn, LLC

(57) ABSTRACT

A braking system for a motorcycle has a first braking device operatively connected to a first wheel of the motorcycle and having a first hydraulic supply circuit, a first electric actuator operatively connected to a first electrically or electro-mechanically actuated piston, and a first interface port operatively connected to a first hydraulic device provided with a first manually actuated piston subdivided into a first direct piston and a first indirect piston hydraulically connected to the first hydraulic supply circuit through a first by-pass duct. A hydraulic fluid reservoir is connected to the first hydraulic device by an upstream connection duct of the first indirect piston and a downstream connection duct of the first indirect piston. A processing and control unit is programmed so that,
(Continued)

upon actuation of the first interface port, the first electrically or electro-mechanically actuated piston translates so as to occlude the first by-pass duct, fluidically disconnect the first manually actuated piston from the first hydraulic supply circuit, and simultaneously actuate the first braking device.

20 Claims, 5 Drawing Sheets

(51) Int. Cl.

| | |
|---|---|
| ***B60T 13/14*** | (2006.01) |
| ***B60T 13/62*** | (2006.01) |
| ***B60T 13/68*** | (2006.01) |
| ***B62L 3/08*** | (2006.01) |

(52) U.S. Cl.

CPC .............. *B60T 13/745* (2013.01); *B62L 3/08* (2013.01); *B60T 2270/402* (2013.01); *B60T 2270/404* (2013.01); *B60T 2270/82* (2013.01)

(56) References Cited

U.S. PATENT DOCUMENTS

| | | | | |
|---|---|---|---|---|
| 6,273,523 | B1 * | 8/2001 | Wakabayashi | B62L 3/08 303/9.64 |
| 6,390,566 | B1 * | 5/2002 | Matsuno | B60T 8/26 303/9.72 |
| 6,733,089 | B1 * | 5/2004 | Wakabayashi | B62L 3/08 188/344 |
| 8,170,765 | B2 * | 5/2012 | Woywod | B60W 30/18027 701/70 |
| 10,814,850 | B2 * | 10/2020 | Chang | B62L 3/08 |
| 2007/0278855 | A1 | 12/2007 | Hatano | |
| 2008/0238646 | A1 | 10/2008 | Hatano | |
| 2009/0033144 | A1 * | 2/2009 | Ikeda | B60T 8/441 303/20 |
| 2009/0243376 | A1 * | 10/2009 | Tahara | B60T 8/3225 303/3 |
| 2012/0298897 | A1 * | 11/2012 | Nakamura | H01F 7/127 251/129.15 |
| 2016/0107624 | A1 * | 4/2016 | Beer | B60T 7/102 303/9.64 |
| 2017/0021895 | A1 * | 1/2017 | Yasukawa | B62K 11/00 |
| 2017/0028973 | A1 | 2/2017 | Arienti et al. | |
| 2017/0166176 | A1 * | 6/2017 | Yang | B60T 13/166 |
| 2017/0253220 | A1 | 9/2017 | Ishihara et al. | |
| 2019/0001946 | A1 * | 1/2019 | Alemanno | B60T 13/662 |
| 2021/0070264 | A1 | 3/2021 | Arienti et al. | |
| 2024/0174207 | A1 * | 5/2024 | Yang | B60T 8/40 |

FOREIGN PATENT DOCUMENTS

| | | | |
|---|---|---|---|
| DE | 102019213326 | A1 | 3/2021 |
| JP | 2007326395 | A | 12/2007 |
| JP | 2016517371 | A | 6/2016 |
| WO | 2012062528 | A2 | 5/2012 |
| WO | 2020058819 | A1 | 3/2020 |

OTHER PUBLICATIONS

Chinese State Intellectual Property Office First Office Action regarding Application No. 202280033071.4, dated Apr. 16, 2026, 12 pages Chengdu, Sichuan Province, China.

Japanese Patent Office Office Action regarding Application No. 2023-568146, dated Apr. 28, 2026, 5 pages Japan.

* cited by examiner

BRAKE-BY-WIRE TYPE BRAKING SYSTEM FOR MOTORCYCLES

FIELD

The present invention relates to a brake-by-wire (BBW) type braking system, particularly for motorcycles.

BACKGROUND

In motorcycles, there are brake-by-wire type braking systems wherein the user may manually operate two separate manual controls, typically a lever on the handlebars, and a pedal, in order to send a request for a braking action to a special control unit.

This request for a braking action is switched to actuate one or more electric motors that act on the friction elements (typically pads, but may also be shoes) of the braking devices with which the motorcycle is equipped. In this way, under normal operating conditions, the user does not directly command the actuation of the braking devices but sends a braking request that is fulfilled by said electric motors, by means of a control unit.

In the event of a malfunction, the system must be able to allow a hydraulic back-up so as to ensure that the user may at least partially brake the motorcycle by direct action on the manually actuated devices.

The solutions of the motorcycles of the prior art do not allow for hydraulic back-up from both controls (lever and brake pedal) in case of failure of the E/E system (ECU, actuators, sensors, etc.) or in case of no power supply (disconnected battery) combined with the need to have a partially fluid-free actuation of the braking system (at least one DRY caliper or axle). Finally, the need is felt to provide braking systems compatible with electric vehicles (blending with regenerative braking, residual torque reduction).

SUMMARY

The need is therefore felt in the art to provide a braking system which allows the technical drawbacks mentioned with reference to the prior art to be resolved.

This need is satisfied by a braking system as described and claimed herein.

In particular, this need is satisfied by a braking system for a motorcycle comprising:

- at least one first braking device operatively connectable to a first wheel of the motorcycle, and equipped with a first hydraulic supply circuit,
- a first electric actuator having first electrical or electro-mechanical motor means operatively connected to a first electrically or electro-mechanically actuated piston fluidically connected to said first hydraulic supply circuit,
- at least one first interface port operatively connected to a first hydraulic device equipped with a first manually actuated piston,
- wherein the first manually actuated piston is subdivided into a first direct piston, directly connected to the first manually actuated device, and a first indirect piston, in series with the first direct piston, connected thereto by the interposition of a first return spring,
- the first indirect piston being in hydraulic connection with said first hydraulic supply circuit through a first by-pass duct, and arranged in series, upstream, with the first electrically or electro-mechanically actuated piston,

- wherein the braking system comprises a hydraulic fluid reservoir fluidically connected to the first hydraulic device by a connecting duct upstream from the first indirect piston and a connecting duct downstream from the first indirect piston,
- wherein the braking system is provided with a processing and control unit, operatively connected to said first electric actuator, programmed so that:
- in standard operation, upon actuation of the first interface port, it translates the first electrically or electro-mechanically actuated piston so as to occlude the first by-pass duct, fluidically disconnects the first manually actuated piston from the first hydraulic supply circuit, and simultaneously actuates the at least one first braking device.

According to a possible embodiment, at least one of said upstream connection duct and downstream connection duct is provided with at least one device having at least one operating condition, such as an open position, which allows fluid to pass through the corresponding connection duct, and one operating condition, such as a closed position, which prevents fluid from passing through the corresponding connection duct, and in which in said standard operation, the devices, such as the selector valves, are switched so that the indirect piston may not move even following manual actuation and remains in an end stop position, while the first electrically or electro-mechanically actuated piston is translated to simultaneously actuate the at least one first braking device.

According to a possible embodiment, the at least one device provides for two operating conditions in which fluid is prevented or allowed to pass through the corresponding upstream connection duct in order to isolate the contribution of the first return spring during operation in hydraulic back-up mode.

According to a possible embodiment, the processing and control unit is programmed so that in back-up mode, it retracts or allows the retraction of the first electrically or electro-mechanically actuated piston so as not to occlude the first by-pass duct and to allow direct actuation of the first braking device by the first manually actuated piston when the first interface port is actuated.

According to a possible embodiment, the processing and control unit is programmed so that, in said back-up operation, it switches the devices, such as the selector valves, so that the first indirect piston may move according to manual actuation.

According to a possible embodiment, the first hydraulic supply circuit is fluidically connected to a pair of first braking devices that may be connected to the same first wheel.

According to a possible embodiment, the first hydraulic supply circuit is fluidically connected to a pair of first braking devices that may be connected to said first wheel and a second wheel, respectively, arranged on different axles of the motorcycle.

According to a possible embodiment, the braking system comprises at least one second manually actuated device, separated from the first manually actuated device, and operatively connected to a second hydraulic device equipped with a second manually actuated piston,

- wherein the second manually actuated piston is hydraulically connected with said first indirect piston through a second by-pass duct, and is arranged in series, upstream, with the first indirect piston, which is in turn fluidically connected to the first hydraulic supply circuit through which it actuates the first braking device and/or a second braking device.

According to a possible embodiment, the second manually actuated piston is in turn subdivided into a second direct piston, directly connected to the second manually actuated device, and a second indirect piston, in series with the second direct piston and connected thereto by the interposition of a second return spring.

According to a possible embodiment, the second indirect piston is in hydraulic connection with the first indirect piston through the second by-pass duct, and is arranged in series, upstream, therewith.

According to a possible embodiment, the first braking device is operatively connectable to said first wheel of a first single axle of the motorcycle, and a second braking device is operatively connectable to a second wheel of a second axle of the motorcycle.

According to a possible embodiment, said first hydraulic device and said second hydraulic device are encompassed in the same pump body.

According to a possible embodiment, the system comprises:

at least a second braking device operatively connected to a second wheel of the motorcycle, and equipped with a second hydraulic supply circuit, fluidically separated from the first hydraulic supply circuit, a second electric actuator having second electric motor means operatively connected to a second electrically or electro-mechanically actuated piston, fluidically connected to said second supply circuit, at least a second manually actuated device operatively connected to a second hydraulic device equipped with a second manually actuated piston, wherein the second manually actuated piston is in hydraulic connection with said second supply circuit through a second by-pass duct, and is arranged in series, upstream, with the second electrically or electro-mechanically actuated piston, wherein the processing and control unit, is operatively connected to the second interface port and said second electric actuator, programmed so that:

in standard operation, when the second interface port is operated, it translates the second electrically or electro-mechanically actuated piston so as to occlude the second by-pass duct, fluidically disconnects the second manually actuated piston from the second supply circuit, and actuates the second braking device.

According to a possible embodiment, at least one of said upstream connection duct and downstream connection duct is provided with a device having at least one operating condition, such as an open position, which allows fluid to pass through the corresponding connection duct, and an operating condition, such as a closed position, which prevents fluid from passing through the corresponding connection duct, and wherein in said standard operation, the devices, such as the selector valves, are switched so that the second indirect piston may not move even following manual actuation, while the second electrically or electro-mechanically actuated piston is translated to simultaneously actuate the at least one second braking device.

According to a possible embodiment, said processing and control unit is programmed so that in back-up operation, it retracts or allows the retraction of the second electrically or electro-mechanically actuated piston so as not to occlude the second by-pass duct and allow direct actuation of the second braking device by the second manually actuated piston.

According to a possible embodiment, the processing and control unit is programmed so that, in back-up operation, it switches devices, such as selector valves, so that the second indirect piston may move according to the manual actuation.

According to a possible embodiment, said first and second braking devices are arranged on different axles of the associated motorcycle.

According to a possible embodiment, said first hydraulic device and said second hydraulic device are encompassed in the same pump body.

According to a possible embodiment, said braking devices comprise disc brakes and/or drum brakes.

DESCRIPTION OF THE DRAWINGS

Further features and advantages of the present invention will become more apparent from the following description of preferred and non-limiting embodiments thereof, in which.

The elements or parts of elements common to the embodiments described hereinafter will be indicated with the same reference numerals.

DETAILED DESCRIPTION

Figure 1:
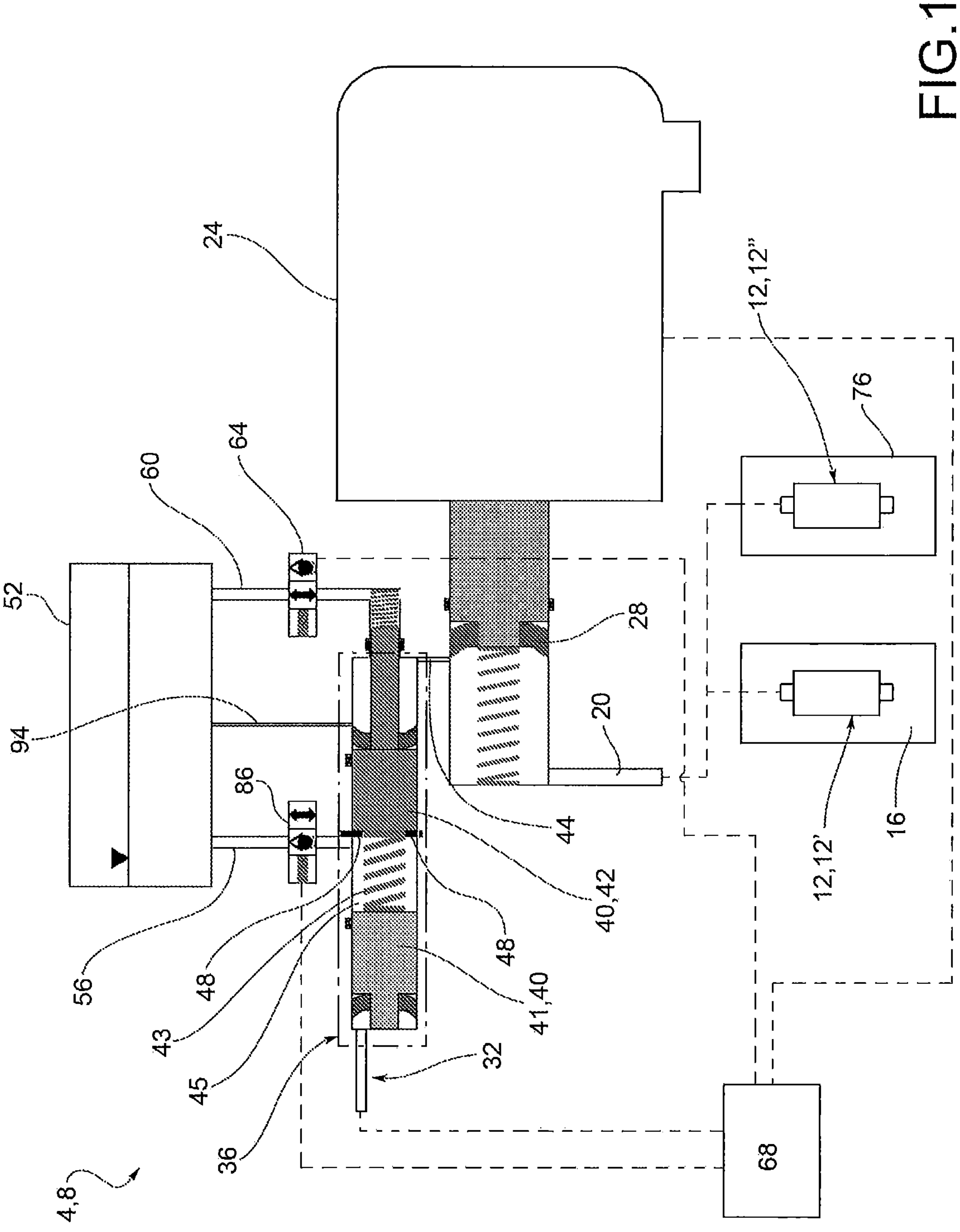
FIG. 1 shows a schematic view of a braking system according to a first embodiment of the present invention, in standard operating condition.

With reference to the aforesaid figures, reference numeral 4 globally denotes a braking system for a vehicle, in particular, for a motorcycle 8.

The braking system 4 for a motorcycle 8 comprises at least a first braking device 12 operatively connectable to a first wheel 16 of the motorcycle 8, and equipped with a first hydraulic supply circuit 20. The braking system 4 further comprises a first electric actuator 24 having first electrical or electro-mechanical motor means operatively connected to a first electrically or electro-mechanically actuated piston 28, fluidically connected to said first hydraulic supply circuit 20.

The connection between the electrical or electro-mechanical motor means and the first electrically or electro-mechanically actuated piston 28 may be direct, or intermediate mechanical connections may be provided, such as gears, gearboxes, linkages, and the like.

The electrically or electro-mechanically actuated first piston 28 is inserted into the first hydraulic supply circuit 20 so as to be able to pressurize, if translated, the fluid contained in said first hydraulic supply circuit and actuate the corresponding first braking device 12.

The braking system 4 comprises at least a first interface or input port 32 operatively connected to a first hydraulic device 36 equipped with a first manually actuated piston 40. Usually, the first interface port 32 is operatively connected to a lever device, usually on the handlebars of the motorcycle 8, or a foot pedal, usually near the foot pegs of the motorcycle 8.

The first manually actuated piston 40 is in hydraulic connection with the first hydraulic supply circuit 20 through a first by-pass duct 44 and is arranged in series, upstream, with the first electrically or electro-mechanically actuated piston 28.

The first manually actuated piston 40 is in turn subdivided into a first direct piston 41, directly connected to the first interface port 32, and a first indirect piston 42, in series with the first direct piston 41 and connected thereto by the interposition of a first return spring 43. A first hydraulic chamber 45 is interposed between the first direct piston 41 and the first indirect piston 42. In said configuration, the first indirect piston 42, if it is free to move, pressurizes the fluid in the first hydraulic supply circuit 20, in a hydraulic back-up condition.

The first hydraulic device 36 is also equipped with a first retainer 48 that forms a limit stop of the first indirect piston 42 as it approaches the first direct piston 41.

The braking system 4 comprises a hydraulic fluid reservoir 52 fluidically connected to the first hydraulic chamber 45 interposed between the direct piston 41 and the indirect piston 42 by an upstream connecting duct 56 from the first indirect piston 42 and a downstream connecting duct 60 of the first indirect piston 42. In addition, the hydraulic fluid reservoir 52 is fluidically connected directly to the first by-pass duct 44 by a connecting or supply duct 94.

Preferably, the first retainer 48 is placed so as to prevent the first indirect piston 42 from occluding the upstream connection duct 56.

Preferably, each of said upstream connection duct 56 and downstream connection duct 60 is provided with at least one device 86,64, respectively, capable of preventing the advancement of the indirect piston 42 in one of its operating conditions; in particular, the at least one device 86,64 provides for at least one operating condition, such as an open position, that allows fluid to pass through the corresponding connection duct 56,60 and one operating condition, such as a closed position, that prevents fluid from passing through the corresponding connection duct 56,60.

Preferably, the at least one device 64 provides for at least one operating condition that prevents fluid from passing through the corresponding downstream connection duct 60, thereby preventing the advancement of the first indirect piston 42, and one operating condition that allows fluid to pass through the downstream connection duct 60.

Preferably, the at least one device 86, 64 may provide two operating conditions wherein fluid is either prevented or allowed to pass through the corresponding upstream connection duct 56, in order to isolate the contribution of the return spring 43 during operation in hydraulic back-up mode.

Preferably said at least one device 86, 64 is a selector valve. According to one embodiment, said at least one selector valve 86,64 is thus switched to allow switching between the standard operating mode and the hydraulic back-up mode.

Preferably, said at least one selector valve 86, 64 is operatively connected to a processing and control unit 68 better described below.

According to one possible embodiment, the at least one selector valve 86,64 also comprises a partially open position wherein it functions as a one-way valve that allows fluid to flow only in one direction, specifically from the hydraulic fluid reservoir 52 through the ducts 60 and 56 to the pistons 41 and 42.

Advantageously, the system is provided with a processing and control unit 68, operatively connected to a first interface port 32 and to said first electric actuator 24.

Said processing and control unit 68 is programmed so that in standard operation, upon actuation of the first interface port 32, it translates the first electrically or electro-mechanically actuated piston 28 so as to occlude the first by-pass duct 44, fluidically disconnect the first manually actuated piston 40 from the first hydraulic supply circuit 20, and simultaneously actuate the at least one first braking device 12.

Due to the fact that the first by-pass duct 44 is occluded, the user is unable to directly modulate the actuation of the first braking device 12, which is instead actuated by the first electrically or electro-mechanically actuated piston 28.

Preferably, in said standard operation, said at least one selector valve 86,64 is switched so that the indirect piston 42 may not move even following manual actuation and remains in the end position defined by the first retainer 48, while the first electrically or electro-mechanically actuated piston 28 is translated to actuate the at least one first braking device 12 simultaneously.

Further, according to one possible embodiment, the processing and control unit 68 is programmed so that in back-up operation, it retracts or allows the retraction of the first electrically or electro-mechanically actuated piston 28 so as not to occlude the first by-pass duct 44 and allow the direct actuation of the first braking device 12 by the first manually actuated piston 40 when the first interface port 32 is actuated.

Preferably, the processing and control unit 68 is programmed so that, in back-up operation, it allows the switching of at least one selector valve 86,64 so that the first indirect piston 42 may move according to manual actuation.

Preferably, said at least one selector valve 86,64 switches to the back-up operating condition through an elastic element.

In other words, in the electrical fault or back-up condition, the user directly actuates the first braking device 12 through the first interface port 32, ensuring that the motorcycle 8 may always be braked or stopped.

The first hydraulic supply circuit 20 may be fluidically connected to a pair of first braking devices 12',12", which may be connected to the same first wheel 16.

It is also possible to provide for the first supply circuit 20 to be fluidically connected to a pair of braking devices 12',12", connectable to said first wheel 16 and a second wheel 76, respectively, arranged on different axles of the motorcycle 8.

Figure 2A:
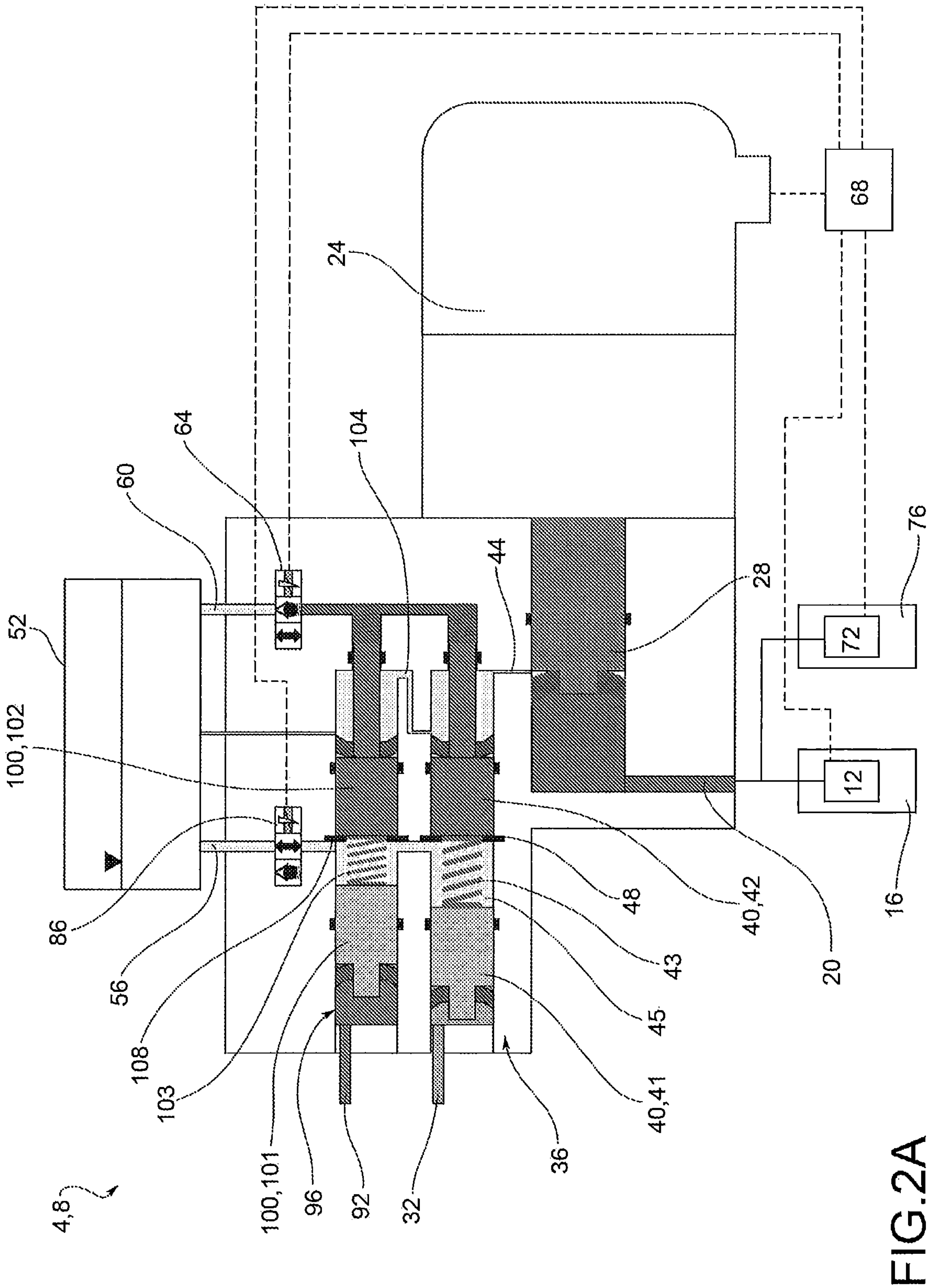
FIG. 2*a*,2*b*,2*c* represent schematic views of a braking system according to a second embodiment of the present invention, in standard operating condition, in the shutdown condition of the BBW system, and in failure or back-up condition, respectively.
Figure 2B:
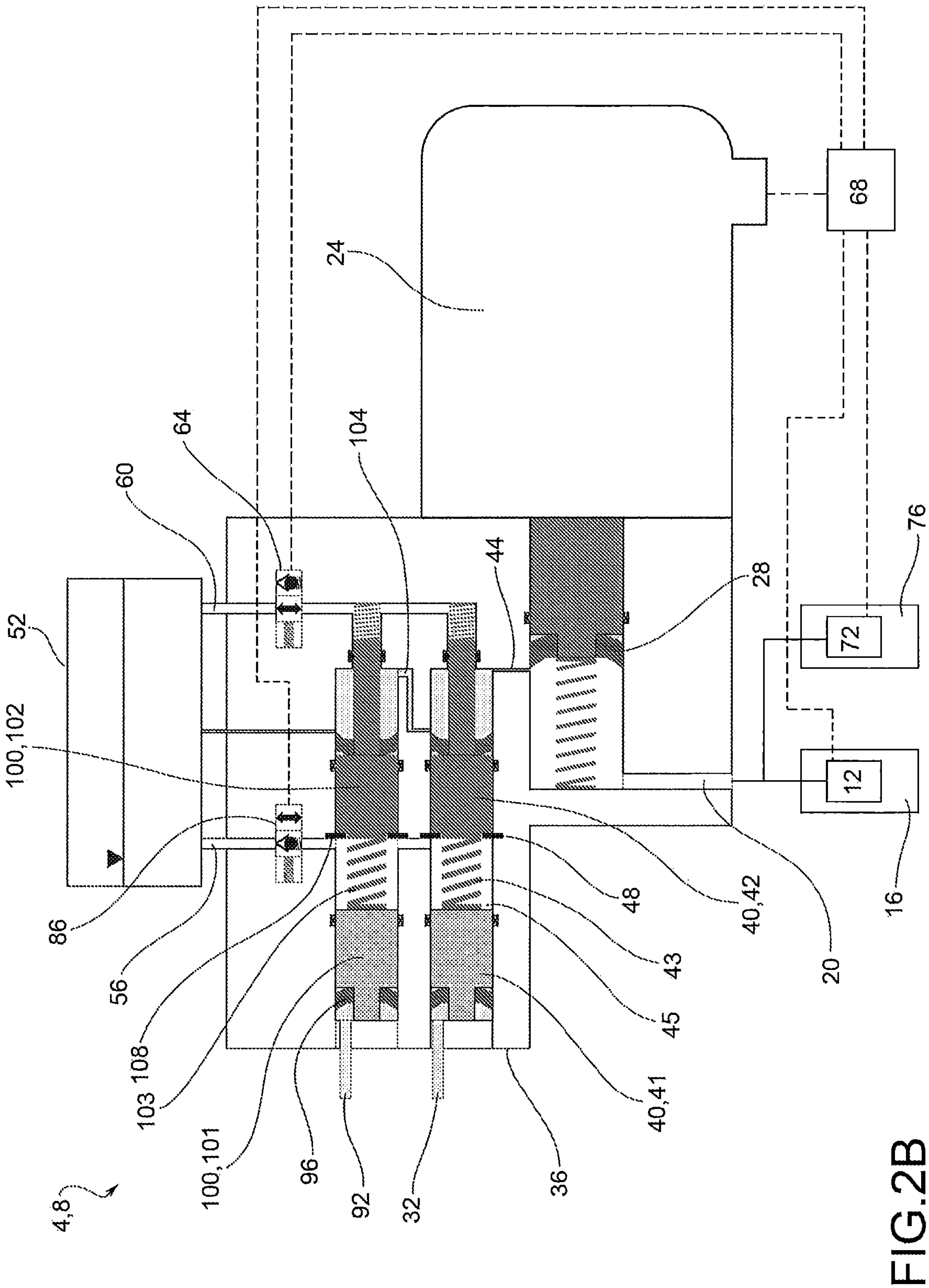
Figure 2C:
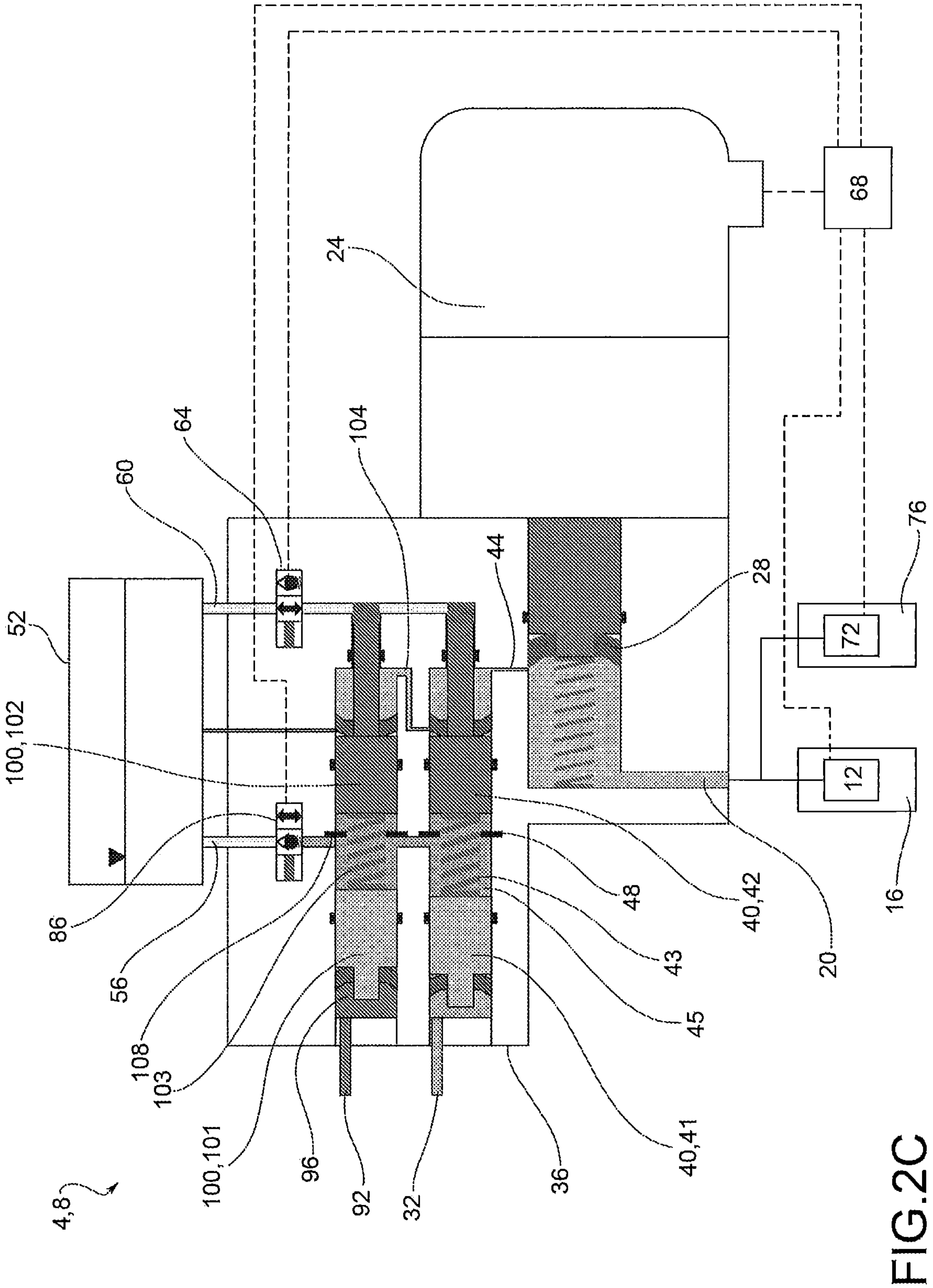

According to a further embodiment of the present invention (FIG. 2*a*-2*c*) the braking system 4 comprises at least one second input port 92, separate from the first input port 32, and operatively connected to a second hydraulic device 96 equipped with a second manually actuated piston 100.

The second manually actuated piston 100 is hydraulically connected to said first indirect piston 42 (which in turn is connected to the first manually actuated piston 41) through a second by-pass duct 104, and is arranged in series, upstream, with the first indirect piston 42. The first indirect piston 42 is in turn fluidically connected with the first hydraulic supply circuit 20 through which it actuates the first braking device 12 and/or the second braking device 72.

Preferably, said first and second hydraulic devices 36,96 are incorporated into the same hydraulic device.

According to a possible embodiment, the first braking device 12 is operatively connected to said first wheel 16 of a first single axle of the motorcycle 8, and a second braking device 72 is operatively connected to a second wheel 76 of a second axle of the motorcycle 8.

The second indirect piston 102 is in hydraulic connection with the first indirect piston 42 through the second by-pass duct 104, and is arranged in series, upstream, therewith.

According to one possible embodiment, the second manually actuated piston 100 is in turn subdivided into a second direct piston 101, directly connected to the second manually actuated device 92, and a second indirect piston 102, in series with the second direct piston 101 and connected thereto by the interposition of a second return spring 103. In such a configuration, the second indirect piston 102 pressurizes the fluid in the second by-pass port 104. A second hydraulic chamber 105 is interposed between the second direct piston 101 and the second indirect piston 102.

The second hydraulic device 96 is also equipped with a second retainer 108 that forms a limit stop of the second indirect piston 102 as it approaches the second direct piston 101.

The braking system 4 comprises, as seen, a hydraulic fluid reservoir 52 fluidically connected to the second hydraulic device 96 by an upstream duct 56 connected to the second indirect piston 102 and a downstream duct 60 connected to the second indirect piston 102.

Preferably, the second retainer 108 is placed so as to prevent the second indirect piston 102 from occluding the upstream connection duct 56.

Preferably, each of said upstream connection duct 56 and downstream connection duct 60 is equipped with at least one selector valve 86,64 having at least one operating condition, such as an open position, that allows fluid to pass through the corresponding connection duct 56,60, and one operating condition, such as a closed position, that prevents fluid from passing through the corresponding connection duct 56,60. Said selector valves 64 are operatively connected to the processing and control unit 68.

According to a possible embodiment, the at least one selector valve 86,64 also comprises a partially open position wherein it functions as a one-way valve that allows fluid to flow only in one direction, specifically from the hydraulic fluid reservoir 52 to the second hydraulic device 96.

Figure 3:
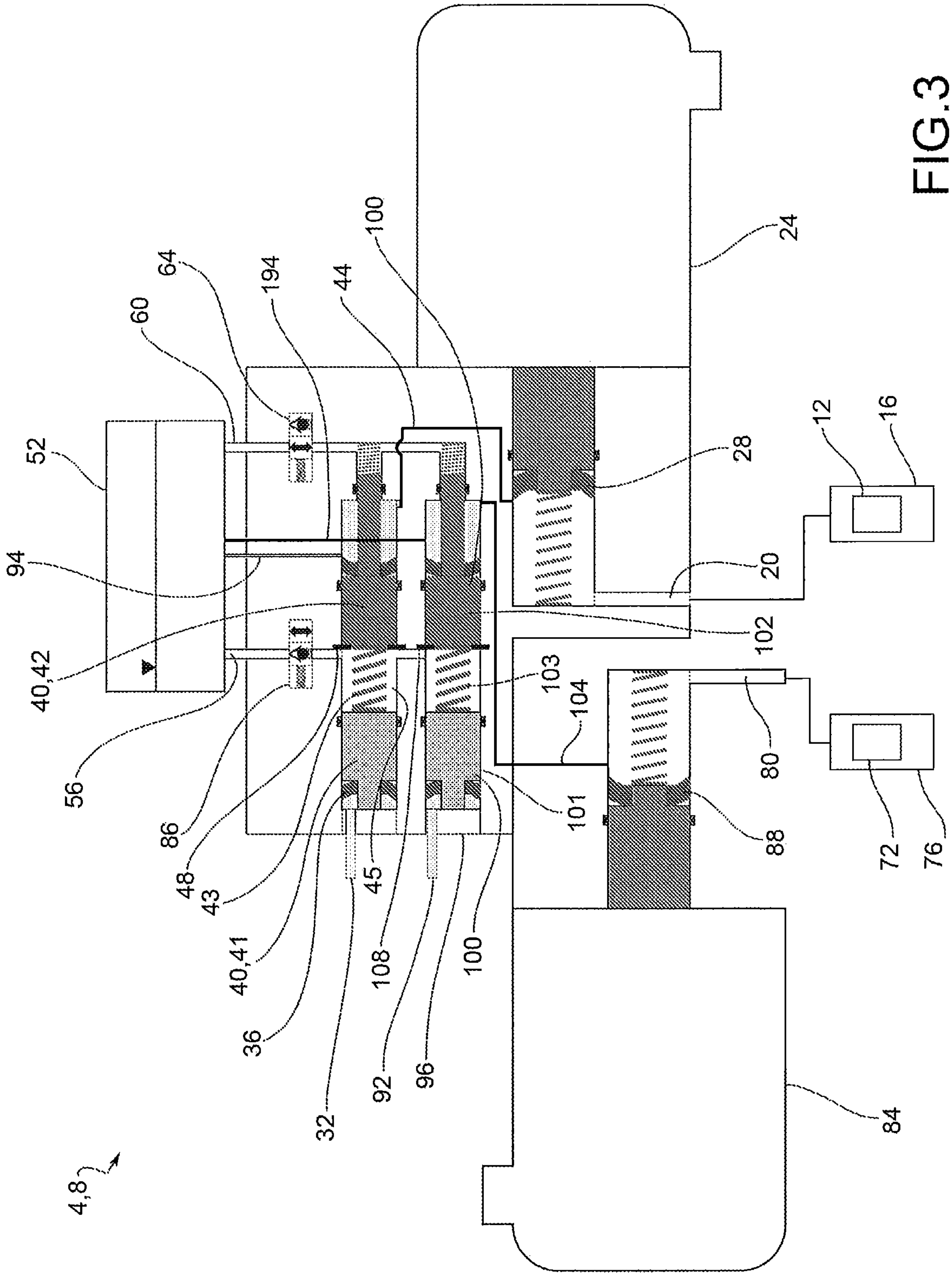
FIG. 3 shows a schematic view of a braking system according to a third embodiment of the present invention, in standard operating condition.

According to a further embodiment of the present invention (FIG. 3), the braking system 4 for a motorcycle 8 comprises at least one second braking device 72 operatively connected to a second wheel 76 of the motorcycle 8, and provided with a second hydraulic supply circuit 80 fluidically separated from the first hydraulic supply circuit 20.

The braking system 4 comprises a second electric actuator 84 having second electric motor means operatively connected to a second electrically or electro-mechanically actuated piston 88 fluidically connected to said second supply circuit 80 and at least a second manually actuated device 92 operatively connected to a second hydraulic device 96 equipped with a second manually actuated piston 100.

The second manually actuated piston 100 is in hydraulic connection with said second supply circuit 80 by a second by-pass duct 104, and is arranged in series, upstream, with the second electrically or electro-mechanically actuated piston 88.

The processing and control unit 68 is operatively connected to the second interface port 92 and to said second electric actuator 84 and is programmed so that, in standard operation, when the second interface port 92 is actuated, it translates the second electrically or electro-mechanically actuated piston 88 so as to occlude the second by-pass duct 104, fluidically disconnect the second manually actuated piston 100 from the second supply circuit 80, and actuate the second braking device 72.

Due to the fact that the second by-pass duct 104 is occluded, the user is unable to directly modulate the actuation of the second braking device 72 which is instead actuated by the second electrically or electro-mechanically actuated piston 88.

Preferably, in said standard operation, the at least one selector valve 86,64 is switched so that the second indirect piston 102 may not move even as a result of the manual actuation and remains in the end position defined by the second retainer 108, while the second electrically or electro-mechanically actuated piston 88 is translated to actuate simultaneously the at least one second braking device 72.

Said processing and control unit 68 is programmed so that in back-up operation, it retracts or allows the retraction of the position of the second electrically or electro-mechanically actuated piston 88 so as not to occlude the second by-pass duct 104 and to allow direct actuation of the second braking device 72 by the second manually actuated piston 100.

Preferably, the processing and control unit 68 is programmed so that, in back-up operation, it allows the switching of at least one selector valve 86,64 so that the second indirect piston 102 may move according to the manual actuation.

Preferably, said first and second braking devices 12,72 are arranged on different axles of the associated motorcycle.

Preferably, said first and second hydraulic devices 36,96 are encompassed in the same pump body.

Preferably, said braking devices 12,72 comprise disc brakes and/or drum brakes.

The first manually actuated piston 40 is in hydraulic connection with the first hydraulic supply circuit 20 through the first by-pass duct 44, and is arranged in series, upstream, with the first electrically or electro-mechanically actuated piston 28.

According to one possible embodiment, the first manually actuated piston is in turn subdivided into a first direct piston 41, directly connected to the first interface port 32, and a first indirect piston 42, in series with the first direct piston 41 and connected thereto by the interposition of a first return spring 43.

In this configuration, the first indirect piston 42 pressurizes the fluid in the first hydraulic supply circuit 20.

The first hydraulic device 36 is also equipped with a first retainer 48 that forms a limit stop of the first indirect piston 42 as it approaches the first direct piston 41.

The braking system 4 comprises a hydraulic fluid reservoir 52 fluidically connected to the first hydraulic device 36 by an upstream duct 56 connected to the first indirect piston 42 and a downstream duct 60 connected to the first indirect piston 42. More specifically, the hydraulic fluid reservoir 52 is fluidically connected to the hydraulic chamber 45 interposed between the first direct piston 41 and the first indirect piston 42.

Further, the hydraulic fluid reservoir 52 is fluidically connected directly to the second by-pass duct 104 via a connection or supply duct 194. Preferably, the first retainer 48 is placed so as to prevent the first indirect piston 42 from occluding the upstream connection duct 56.

Preferably, at least one of said upstream connection duct 56 and downstream connection duct 60 is equipped with at least one device, such as a selector valve 64,86 capable of preventing the advancement of the first indirect piston 42 in one of its operating conditions, having at least one operating condition, such as an open position, that allows fluid to pass through the corresponding connection duct 56,60 and one operating condition, such as a closed position, that prevents fluid from passing through the corresponding connection duct 56,60.

For example, the at least one device 64 provides for at least one operating condition that prevents fluid from passing through the corresponding downstream connection duct 60, thereby preventing the advancement of the first indirect piston 42 and one operating condition that allows fluid to pass through the downstream connection duct 60.

Preferably, the at least one device 86,64 may provide two operating conditions under which the fluid is either prevented or allowed to pass through the corresponding upstream connection duct 56 in order to isolate the contribution of the return spring 43 during operation in hydraulic back-up mode.

Said at least one selector valve 64,86 is operatively connected to a processing and control unit 68 better described below.

According to a possible embodiment, the at least one selector valve 86,64 also comprises a partially open position wherein it functions as a one-way valve that allows fluid flow only in one direction, specifically from the hydraulic fluid reservoir 52 to the first hydraulic device 36.

According to an embodiment, the second manually actuated piston 100 is in turn subdivided into a second direct piston 101, directly connected to the second manual actuating device 92, and a second indirect piston 102, in series with the second direct piston 101 and connected thereto by the interposition of a second return spring 103. In this configuration, the second indirect piston 102 pressurizes the fluid in the second hydraulic supply circuit 80.

The second hydraulic device 96 is also equipped with a second retainer 108 that forms a limit stop of the second indirect piston 102 as it approaches the second direct piston 101.

As may be appreciated from that which is described, the present invention overcomes the drawbacks of the prior art.

Specifically, the braking system of the present invention allows the hydraulic back-up to be operated from both the controls (lever and brake pedal) in case of failure of the E/E system (ECU, actuators, sensors, etc.) or in case of power failure (disconnected battery) in combination with an actuation of the partially fluid-free braking system (at least one DRY caliper).

Finally, the present invention enables the provision of braking systems compatible with electric vehicles (blending with regenerative braking, residual torque reduction).

A person skilled in the art, for the purpose of satisfying contingent and specific needs, may make numerous modifications and variations to the braking systems and motorcycles described above, all of which are, however, contained in the present invention as mechanical and/or functional equivalents.

The scope of protection of the invention is defined by the following claims.

The invention claimed is:

1. A braking system for a motorcycle, comprising:

at least one first braking device operatively connected to a first wheel of the motorcycle, and provided with a first hydraulic supply circuit, a first electric actuator having first motor means, electrically or electro-mechanically actuated and operatively connected to a first electrically or electro-mechanically actuated piston fluidically connected to said first hydraulic supply circuit, at least one first interface port operatively connected to a first hydraulic device provided with a first manually actuated piston, wherein the first manually actuated piston is subdivided into a first direct piston, directly connected to the first interface port, and a first indirect piston, in series with the first direct piston, and connected to the first direct piston by interposition of a first return spring, the first indirect piston being hydraulically connected to said first hydraulic supply circuit through a first by-pass duct, and arranged in series, upstream, with the first electrically or electro-mechanically actuated piston, wherein the braking system comprises a hydraulic fluid reservoir fluidically connected to the first hydraulic device by an upstream connection duct of the first indirect piston and a downstream connection duct of the first indirect piston, and wherein the braking system is provided with a processing and control unit, operatively connected to said first electric actuator, and programmed so that:

in standard operation, upon actuation of the first interface port, the first electrically or electro-mechanically actuated piston translates so as to occlude the first by-pass duct, fluidically disconnect the first manually actuated piston from the first hydraulic supply circuit, and simultaneously operate the at least one first braking device, wherein at least one of said upstream connection duct and downstream connection duct is provided with at least one device having at least one operating condition, including an open position, which allows fluid to pass through the corresponding connection duct, and at least one operating condition, including a closed position, which prevents a passage of fluid through the corresponding connection duct, and wherein in said standard operation, said at least one device is switched so that the first indirect piston cannot move even following a manual actuation and remains in an end stop position, while the first electrically or electro-mechanically actuated piston is translated to simultaneously actuate the at least one first braking device.

2. The braking system of claim 1, wherein the at least one device provides for two operating conditions in which the passage of fluid through the corresponding upstream connection duct is prevented or allowed, in order to isolate a contribution of the first return spring during operation in hydraulic back-up mode.

3. The braking system of claim 1, wherein the processing and control unit is programmed so that in a back-up mode, the processing and control unit retracts or allows a retraction of the first electrically or electro-mechanically actuated piston so as not to occlude the first by-pass duct and to allow direct actuation of the at least one first braking device by the first manually actuated piston, when the first interface port is actuated.

4. The braking system of claim 1, wherein the processing and control unit is programmed so that in a back-up mode, the processing and control unit retracts or allows a retraction of the first electrically or electro-mechanically actuated piston so as not to occlude the first by-pass duct and to allow direct actuation of the at least one first braking device by the first manually actuated piston, when the first interface port is actuated, and wherein the processing and control unit is programmed such that, in said back-up mode, the processing and control unit switches the at least one device so that the first indirect piston is movable according to the manual actuation.

5. The braking system of claim 1, wherein the first hydraulic supply circuit is fluidically connected to a pair of first braking devices connectable to the first wheel.

6. The braking system of claim 1, wherein the first hydraulic supply circuit is fluidically connected to a pair of first braking devices connectable to said first wheel and to a second wheel respectively, arranged on different axles of the motorcycle.

7. The braking system of claim 1, further comprising a second manually actuated device, separate from the first interface port, and operatively connected to a second hydraulic device provided with a second manually operated piston, wherein the second manually operated piston is hydraulically connected to said first indirect piston through a second by-pass duct, and is arranged in series, upstream, with the first indirect piston which is in turn fluidically connected to the first hydraulic supply circuit through which first the indirect piston operates the at least one first braking device and/or a second braking device.

8. The braking system of claim 7, wherein the second manually operated piston is subdivided into a second direct piston directly connected to the second manually actuated device, and a second indirect piston, in series with the second direct piston and connected therewith by interposition of a second return spring, wherein the second indirect piston is in hydraulic connection with the first indirect piston via the second by-pass duct, and is arranged in series, upstream, therewith.

9. The braking system of claim 7, wherein the at least one first braking device is operatively connectable to said first wheel of a first single axle of the motorcycle and the second braking device is operatively connectable to a second wheel of a second axle of the motorcycle.

10. The braking system of claim 7, wherein said first and second hydraulic devices are encompassed in a same pump body.

11. The braking system of claim 1, wherein the braking system further comprises:

at least one second braking device operatively connected to a second wheel of the motorcycle, and provided with a second hydraulic supply circuit, fluidically separate from the first hydraulic supply circuit, a second electric actuator having second electric motor means operatively connected to a second electrically or electro-mechanically actuated piston fluidically connected to said second hydraulic supply circuit, at least one second manually actuated device operatively connected to a second hydraulic device provided with a second manually actuated piston, wherein the second manually actuated piston is hydraulically connected to said second hydraulic supply circuit via a second by-pass duct, and is arranged in series, upstream, with the second electrically or electro-mechanically actuated piston, and wherein the processing and control unit is operatively connected to the second interface port and to said second electric actuator and programmed so that:

in standard operation, upon actuation of the second interface port, the second electrically or electro-mechanically actuated piston translates so as to occlude the second by-pass duct, fluidically disconnect the second manually actuated piston from the second hydraulic supply circuit, and actuate the at least one second braking device.

12. The braking system of claim 11, wherein at least one of said upstream connection duct and downstream connection duct is provided with at least one device having at least one operating condition, including an open position, which allows fluid to pass through the corresponding connection duct, and an operating condition, including a closed position, which prevents a passage of fluid through the corresponding connection duct, and wherein in said standard operation, said at least one device is switched so that the second indirect piston cannot move even following manual actuation, while the second electrically or electro-mechanically actuated piston is moved to simultaneously actuate the at least one second braking device.

13. The braking system of claim 12, wherein said processing and control unit is programmed so that in a back-up mode, the processing and control unit retracts or allows a retraction of the second electrically or electro-mechanically actuated piston so as not to occlude the second by-pass duct and to allow direct actuation of the at least one second braking device by the second manually actuated piston.

14. The braking system of claim 13, wherein the processing and control unit is programmed such that, in the back-up mode, the processing and control unit switches the at least one device so that the second indirect piston is movable in accordance with the manual actuation.

15. The braking system of claim 11, wherein said at least one first and second braking devices are placed on different axles of the motorcycle.

16. The braking system of claim 11, wherein said first and second hydraulic devices are encompassed in a same pump body.

17. The braking system of claim 11, wherein said at least one first and second braking devices comprise disc brakes and/or drum brakes.

18. A motorcycle comprising the braking system of claim 1.

19. A braking system for a motorcycle, comprising:

at least one first braking device operatively connected to a first wheel of the motorcycle, and provided with a first hydraulic supply circuit, a first electric actuator having first motor means, electrically or electro-mechanically actuated and operatively connected to a first electrically or electro-mechanically actuated piston fluidically connected to said first hydraulic supply circuit, at least one first interface port operatively connected to a first hydraulic device provided with a first manually actuated piston, wherein the first manually actuated piston is subdivided into a first direct piston, directly connected to the first interface port, and a first indirect piston, in series with the first direct piston, and connected to the first direct piston by interposition of a first return spring, the first indirect piston being hydraulically connected to said first hydraulic supply circuit through a first by-pass duct, and arranged in series, upstream, with the first electrically or electro-mechanically actuated piston, wherein the braking system comprises a hydraulic fluid reservoir fluidically connected to the first hydraulic device by an upstream connection duct of the first indirect piston and a downstream connection duct of the first indirect piston, and wherein the braking system is provided with a processing and control unit, operatively connected to said first electric actuator, and programmed so that:

in standard operation, upon actuation of the first interface port, the first electrically or electro-mechanically actuated piston translates so as to occlude the first by-pass duct, fluidically disconnect the first manually actuated piston from the first hydraulic supply circuit, and simultaneously operate the at least one first braking device, wherein the braking system further comprises a second manually actuated device, separate from the first interface port, and operatively connected to a second hydraulic device provided with a second manually operated piston, wherein the second manually operated piston is hydraulically connected to said first indirect piston through a second by-pass duct, and is arranged in series, upstream, with the first indirect piston which is in turn fluidically connected to the first hydraulic supply circuit through which first the indirect piston operates the at least one first braking device and/or a second braking device.

20. A braking system for a motorcycle, comprising:

at least one first braking device operatively connected to a first wheel of the motorcycle, and provided with a first hydraulic supply circuit, a first electric actuator having first motor means, electrically or electro-mechanically actuated and operatively connected to a first electrically or electro-mechanically actuated piston fluidically connected to said first hydraulic supply circuit, at least one first interface port operatively connected to a first hydraulic device provided with a first manually actuated piston, wherein the first manually actuated piston is subdivided into a first direct piston, directly connected to the first interface port, and a first indirect piston, in series with the first direct piston, and connected to the first direct piston by interposition of a first return spring, the first indirect piston being hydraulically connected to said first hydraulic supply circuit through a first by-pass duct, and arranged in series, upstream, with the first electrically or electro-mechanically actuated piston, wherein the braking system comprises a hydraulic fluid reservoir fluidically connected to the first hydraulic device by an upstream connection duct of the first indirect piston and a downstream connection duct of the first indirect piston, and wherein the braking system is provided with a processing and control unit, operatively connected to said first electric actuator, and programmed so that:

in standard operation, upon actuation of the first interface port, the first electrically or electro-mechanically actuated piston translates so as to occlude the first by-pass duct, fluidically disconnect the first manually actuated piston from the first hydraulic supply circuit, and simultaneously operate the at least one first braking device, wherein the braking system further comprises:

at least one second braking device operatively connected to a second wheel of the motorcycle, and provided with a second hydraulic supply circuit, fluidically separate from the first hydraulic supply circuit, a second electric actuator having second electric motor means operatively connected to a second electrically or electro-mechanically actuated piston fluidically connected to said second hydraulic supply circuit, at least one second manually actuated device operatively connected to a second hydraulic device provided with a second manually actuated piston, wherein the second manually actuated piston is hydraulically connected to said second hydraulic supply circuit via a second by-pass duct, and is arranged in series, upstream, with the second electrically or electro-mechanically actuated piston, and wherein the processing and control unit is operatively connected to the second interface port and to said second electric actuator and programmed so that:

in standard operation, upon actuation of the second interface port, the second electrically or electro-mechanically actuated piston translates so as to occlude the second by-pass duct, fluidically disconnect the second manually actuated piston from the second hydraulic supply circuit, and actuate the at least one second braking device.

* * * * *